US012491527B2

(12) United States Patent
Kim et al.

(10) Patent No.: US 12,491,527 B2
(45) Date of Patent: Dec. 9, 2025

(54) DEVICE FOR STORING AND DISPENSING AT LEAST TWO COSMETIC PRODUCTS AND RELATED METHOD

(71) Applicant: L'OREAL, Paris (FR)

(72) Inventors: JinSeok Kim, Shanghai (CN); Venkatesh Sheregar, Shanghai (CN); Christophe Faucheur, Clichy (FR); Hui Zhang, Shanghai (CN); Nicolas Albisetti, Clichy (FR)

(73) Assignee: L'OREAL, Paris (FR)

( * ) Notice: Subject to any disclaimer, the term of this patent is extended or adjusted under 35 U.S.C. 154(b) by 179 days.

(21) Appl. No.: 18/553,061

(22) PCT Filed: Apr. 6, 2021

(86) PCT No.: PCT/CN2021/085595

§ 371 (c)(1),
(2) Date: Sep. 28, 2023

(87) PCT Pub. No.: WO2022/213249

PCT Pub. Date: Oct. 13, 2022

(65) Prior Publication Data

US 2024/0181481 A1 Jun. 6, 2024

(51) Int. Cl.
*B05B 11/10* (2023.01)

(52) U.S. Cl.
CPC ...... *B05B 11/1084* (2023.01); *B05B 11/1047* (2023.01)

(58) Field of Classification Search
CPC ........................ B05B 11/1084; B05B 11/1047
See application file for complete search history.

(56) References Cited

U.S. PATENT DOCUMENTS 6,454,135 B1 * 9/2002 Brozell ............... B05B 11/1011 222/162
8,857,671 B2 10/2014 Muller et al.
(Continued)

FOREIGN PATENT DOCUMENTS

CN 2568577 Y 8/2003
CN 2936998 Y 8/2007
(Continued)

OTHER PUBLICATIONS

International Search Report and Written Opinion issued on Jan. 6, 2022 for corresponding PCT Application No. PCT/CN2021/085595.

(Continued)

*Primary Examiner* — Frederick C Nicolas
(74) *Attorney, Agent, or Firm* — POLSINELLI PC

(57) ABSTRACT

A device for packaging and dispensing a cosmetic product prepared by mixing a first and a second bulk comprises: a bottle defining a bottle reservoir containing the first bulk; a cartridge defining a cartridge reservoir containing the second bulk and comprising a seal, the cartridge being arranged between a disassembled configuration and a mounted configuration; a seal opening mechanism adapted to open the seal in the mounted configuration, the bottle reservoir and the cartridge reservoir being in fluid communication in the mounted configuration; and a dispensing apparatus. The cartridge comprises a removable cartridge-sealing plug designed to cover the seal in the disassembled configuration and being replaced with the bottle in the mounted configuration.

20 Claims, 3 Drawing Sheets

(56) References Cited

U.S. PATENT DOCUMENTS

| | | | | |
|---|---|---|---|---|
| 9,579,673 | B2 * | 2/2017 | Burrowes | B05B 11/0038 |
| 10,035,159 | B2 | 7/2018 | Bruder et al. | |
| 10,918,191 | B2 * | 2/2021 | Kang | B05B 11/1084 |
| 11,034,503 | B1 * | 6/2021 | Lee | B05B 11/0054 |
| 11,155,399 | B2 * | 10/2021 | Yan | F04B 39/14 |
| 11,498,744 | B2 * | 11/2022 | Lee | B65D 81/3288 |
| 11,753,233 | B2 * | 9/2023 | Kim | B65D 81/3227 222/135 |
| 2003/0089738 | A1 | 5/2003 | Peterson | |
| 2016/0286932 | A1 | 10/2016 | Lee | |
| 2018/0222663 | A1 | 8/2018 | Fishman et al. | |
| 2019/0366370 | A1 * | 12/2019 | Kang | A45D 33/26 |
| 2020/0398295 | A1 | 12/2020 | De Beaumesnil | |
| 2022/0055055 | A1 * | 2/2022 | Lee | B05B 11/1005 |
| 2022/0169433 | A1 * | 6/2022 | Kim | B05B 11/028 |
| 2023/0149271 | A1 * | 5/2023 | Kim | A47K 5/18 424/52 |

FOREIGN PATENT DOCUMENTS

| | | | |
|---|---|---|---|
| CN | 201404880 | Y | 2/2010 |
| CN | 102725074 | A | 10/2012 |
| CN | 106061622 | A | 10/2016 |
| KR | 101597091 | B1 | 2/2016 |

OTHER PUBLICATIONS

Preliminary Search Report issued on Nov. 25, 2021 for corresponding French Application No. FR2104671.

* cited by examiner

DEVICE FOR STORING AND DISPENSING AT LEAST TWO COSMETIC PRODUCTS AND RELATED METHOD

CROSS-REFERENCE TO RELATED APPLICATIONS

This application is a national stage application (under 35 U.S.C. § 371) of PCT/CN2021/085595, filed Apr. 6, 2021, disclosure of which is incorporated herein by reference in its entirety.

The present invention concerns a device for storing and dispensing at least two cosmetic products, comprising:

- a container comprising at least a first reservoir configured to contain a first cosmetic product and a second reservoir configured to contain a second cosmetic product;
- a first dispenser comprising a first pump extending along a first pump axis, a first mobile stem and a first sampling tube immersed in the first reservoir;
- a second dispenser comprising a second pump extending along a second pump axis parallel to the first pump axis, a second mobile stem and a second sampling tube immersed in the second reservoir;
- a distribution nozzle, connected to the first mobile stem and to the second mobile stem, the distribution nozzle comprising at least a duct for dispensing the first cosmetic product and the second cosmetic product, the nozzle being mobile with regards to the container between a rest position and a dispensing position, the nozzle comprising a push surface and a guiding wall extending from the push surface towards the container.

The device is configured to deliver the at least two cosmetic products, to let the user form a mixture of the at least two products before its application on a body surface.

The mixture of the at least two cosmetic products is for example a care product, a make-up product, and/or a hair coloration product.

More generally, a cosmetic product is a product as defined in EC Regulation N° 1223/2009 of the European Parliament and the Council dated Nov. 30, 2009, relating to cosmetic products.

Some mixtures of cosmetic products, for example in the field of trio total care products are unstable in time and therefore active in a limited period in time. This is the case for example when a total whitening care product is mixed with deep whitening product, anti-oxidation product and outer layer color correction and protection.

Some mixtures have a higher viscosity than the viscosity of each cosmetic product from which they are prepared, the viscosity of the mixture being too high to enable the mixture to flow correctly in a distribution channel.

When such a situation occurs, the mixture cannot be stored in a unique container of a dispensing device. The cosmetic products are packaged separately and the mixture is directly prepared in a separate accessory.

Moreover, the two products should generally be delivered simultaneously with a predetermined ratio from a single nozzle, which is pressed by the user.

When only one nozzle dispenses the two products, the first dispenser associated with the first reservoir and the second dispenser associated with the second reservoir are located quite far apart. There is a risk of unbalanced pressing of the nozzle, which will deliver the products with a ratio different from the predetermined ratio.

One aim of the invention is therefore to provide an easy to use device for storing two cosmetic products that allows an effective dispensing of said cosmetic products.

To this aim, the subject matter of the invention is a device of the above type, characterized in that the device further comprises a guiding support mounted on the container between the container and the nozzle, the guiding support comprising an inner guiding portion and an outer guiding portion, the inner and outer guiding portions defining an intermediate guiding space, the guiding wall of the nozzle being guided by the inner and outer guiding portions within the intermediate guiding space so that the nozzle is displaced parallel to the first and second pump axes between the rest position and the dispensing position.

Such a guiding support allows dispensing of both cosmetic products while avoiding imbalances when the distribution nozzle is pushed towards the container. The cooperation between the guiding wall and the intermediate guiding space makes it possible to have a highly precise movement of the nozzle parallel to the axes of the first and second pump.

In a variant, the guiding wall of the nozzle slides on the inner guiding portion and on the outer guiding portion between the rest position and dispensing position.

The sliding of the guiding wall on the inner and outer guiding portions enables a smooth and precise guiding of the nozzle between the rest and dispensing positions.

In a variant, the inner guiding portion comprises two collars, each mobile stem being guided by one collar between the rest position and the dispensing position.

The two collars enable precise guiding of the first and second mobile stems between the rest and dispensing positions.

In a variant, the guiding support further comprises a junction portion connecting the inner guiding portion and the outer guiding portion, the intermediate guiding space being delimited between the inner guiding portion, the outer guiding portion and the junction portion;

In another variant, the inner guiding portion comprises at least an inner sleeve, the outer guiding portion comprising at least an outer sleeve, the junction portion comprising at least an annular junction, the at least one annular junction connecting the at least one inner sleeve with the at least one outer sleeve, the intermediate guiding space being delimited between the at least one outer sleeve, the at least one inner sleeve and the at least one annular junction.

The junction portion improves the robustness of the guiding support. Thanks to the junction portion, the inner guiding portion and the outer guiding portion are connected. This makes the assembly of the guiding support on the container easier.

In a variant, the intermediate guiding space is complementary to the guiding wall of the nozzle, so that, between the rest position and the dispensing position, the nozzle is displaced according to a single degree of freedom corresponding to a component of translation parallel to the first and second pump axes.

The intermediate guiding space being complementary to the guiding wall enables restricting any movement of the nozzle other than a movement parallel to the first and second pump axes. Each mobile stem is thus displaced simultaneously and identically between the rest and dispensing positions.

In a variant, the outer guiding portion comprises two outer sleeves and an outer intermediate connection region between the outer sleeves, the outer intermediate connection region outwardly delimiting at least part of the intermediate guiding space, the outer intermediate connection region protruding towards a plane comprising the first and second pump axes, and/or the inner guiding portion comprises two inner sleeves and an inner intermediate connection region between the inner sleeves, the inner intermediate connection region having a recess extending towards the plane comprising the first and second pump axes, the inner intermediate connection region inwardly delimiting at least part of the intermediate guiding space, the guiding wall being further guided in the intermediate guiding space by the inner intermediate connection region and/or by the outer intermediate connection region between the rest and dispensing positions.

In another variant, the minimum width of the inner intermediate connection region taken in projection onto a projection plane perpendicular to the first pump axis and to the second pump axis is smaller than the maximum width of each inner sleeve.

The inner intermediate connection region and the outer intermediate connection region make it possible to further improve the guiding of the distribution nozzle by further restricting the guiding space. Thanks to the intermediate connection regions, the geometry of the guiding space is optimal for a guiding of the nozzle along a single degree of freedom.

In a variant, the inner guiding portion comprises radial fins protruding radially outwards from the or each inner sleeve, the intermediate guiding space being defined between the radial fins and the or each outer sleeve.

The radial fins further restrict the guiding space. The intermediate guiding space thus extends between edges of the fins and the outer sleeve. The guiding of the nozzle is further improved, while the structure remains light.

In a variant, the cross section of the or each inner sleeve taken in projection onto a projection plane perpendicular to the first pump axis and to the second pump axis has a substantially circular shape and/or the or each outer sleeve taken in projection onto the projection plane has a substantially arc of a circle shape.

The circular shape of the or each inner sleeve and/or the arc of a circle shape of the or each outer sleeve make the intermediate guiding space curved. This makes it possible to obtain an efficient guiding of the nozzle while optimizing the compactness of the device.

In a variant, the nozzle comprises a first dispensing duct for dispensing the first cosmetic product and a second dispensing duct for dispensing the second cosmetic product, each duct being connected to a respective mobile stem.

In another variant, each mobile stem comprises an annular groove, the first and second dispensing ducts each comprising a tubular wall delimiting a flow path through which the corresponding cosmetic product is designed to flow, each tubular wall extending within an annular groove of a stem.

Each mobile stem is firmly connected to a corresponding dispensing duct. This further improves the robustness of the device.

The invention also concerns a method for dispensing at least two cosmetic products, comprising:

- providing a device as described above;
- moving the nozzle between the rest position and the dispensing position; and
- delivering simultaneously the first and second cosmetic products through the at least one duct, the guiding wall of the nozzle being guided by the inner and outer guiding portions within the intermediate guiding space so that the nozzle is displaced parallel to the first and second pump axes between the rest position and the dispensing position.

The invention will be better understood, upon reading of the following description, given solely as an example, and made in reference to the following drawings, in which.

Figure 1:
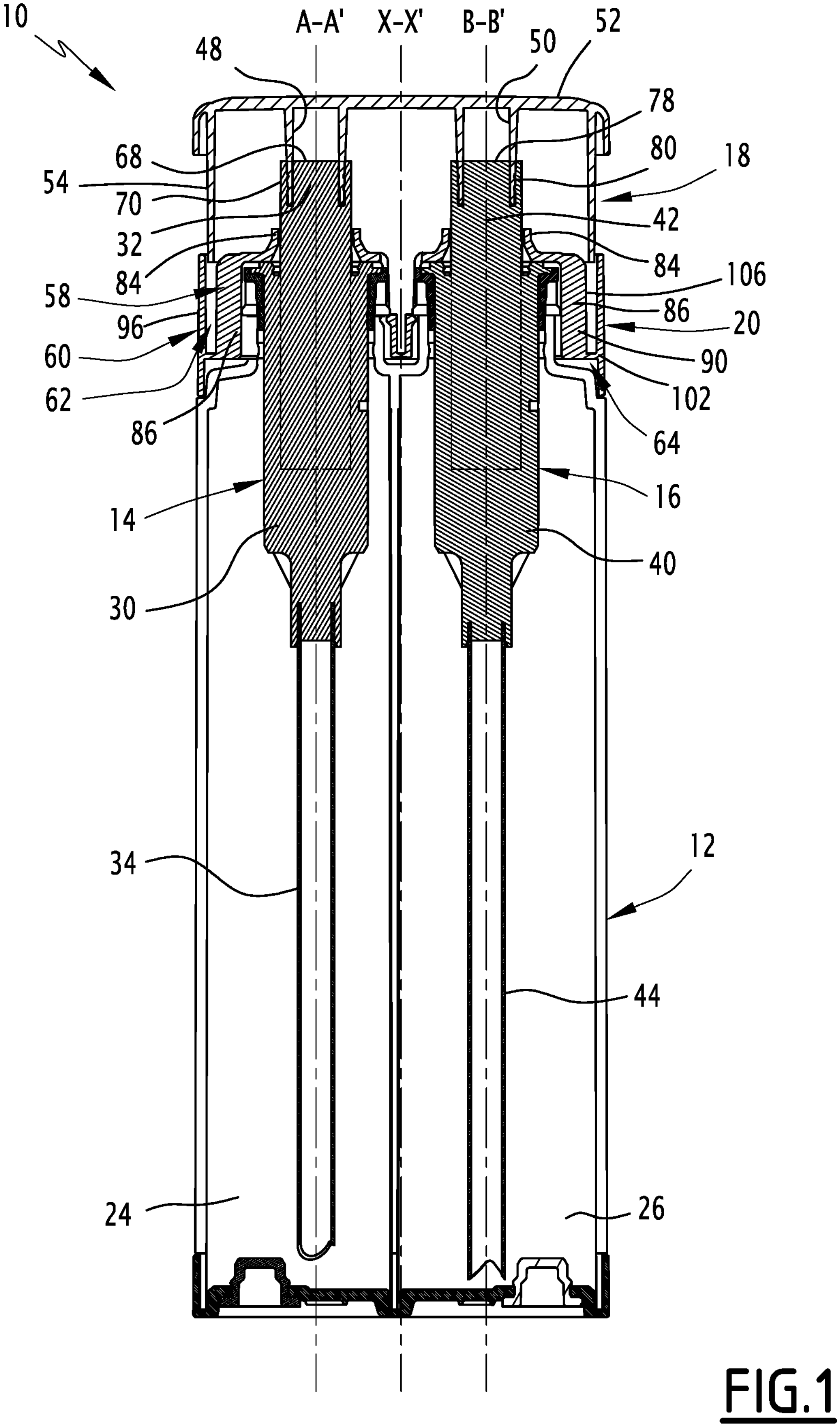
FIG. 1 is a view taken in vertical section along a vertical medial plane of a device for storing and dispensing a cosmetic product according to the invention, the distribution nozzle being in the rest position.
Figure 2:
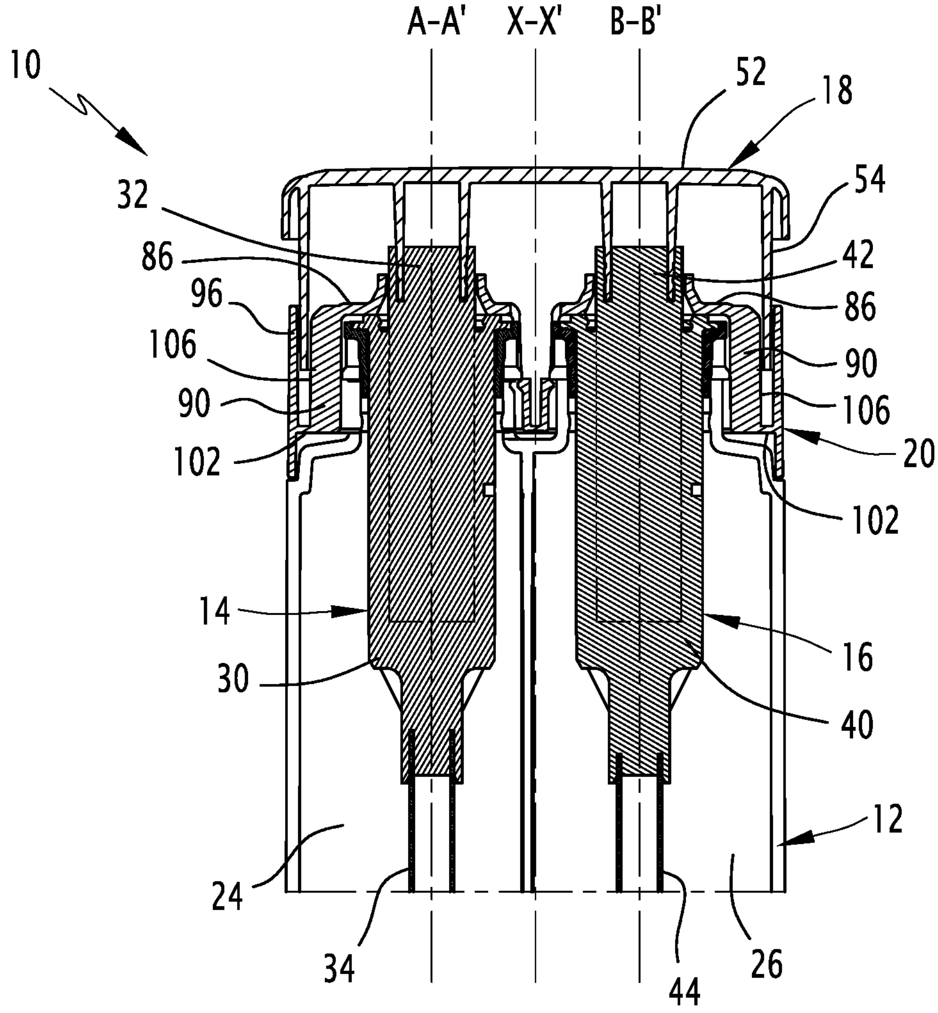
FIG. 2 is a view taken in vertical section along a vertical medial plane of the device of FIG. 1, the distribution nozzle being in the dispensing position.
Figure 3:
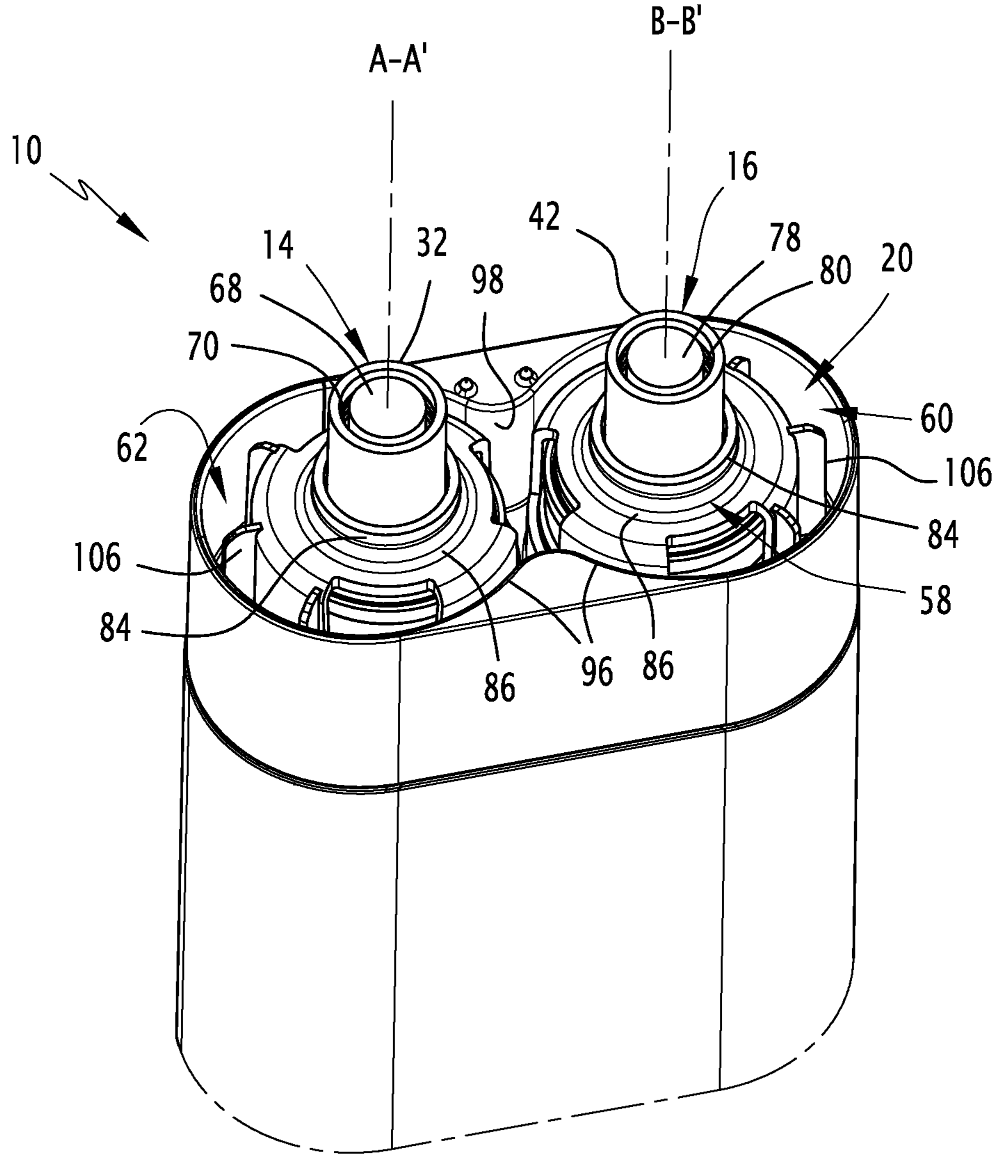
FIG. 3 is a perspective view of the device of FIG. 1, the distribution nozzle being omitted.

A device 10 for storing and dispensing at least two cosmetic products, designed to form a cosmetic composition is shown on FIGS. 1 to 3.

The cosmetic composition is for example a composition for care of a body surface, a composition for make-up of a body surface or preferably, a composition for coloring keratin fibers of a user, in particular the hair of a user.

In order to form the cosmetic composition, the at least two cosmetic products are mixed.

The cosmetic products are products such as defined in EC Regulation N° 1223/2009 of the European Parliament and the Council of Nov. 30, 2009.

The device 10 extends along a longitudinal axis X-X' which is here vertical.

The device 10 comprises a container 12, a first dispenser 14, a second dispenser 16, a distribution nozzle 18 and a guiding support 20.

The container 12 is configured to contain a first cosmetic product and a second cosmetic product.

The container 12 comprises at least a first reservoir 24 configured to contain the first cosmetic product and a second reservoir 26 configured to contain the second cosmetic product.

The first dispenser 14 comprises a first pump 30, a first mobile stem 32 and a first sampling tube 34.

The first pump 30 extends along a first pump axis A-A'. The first pump axis A-A' is parallel to the longitudinal axis X-X'.

The first mobile stem 32 connects the first pump 30 to the distribution nozzle 18. The first mobile stem 32 is a mobile hollow rod which controls the actuation of the first pump 30. It comprises a first product outlet 68 at the top end of the stem 32 and a first annular groove 70. Said outlet 68 is inserted in the nozzle 18. The first annular groove 70 extends at the top end of the stem 32 around the first product outlet 68. As it will be explained below, the nozzle 18 extends within the first annular groove 70 so that the nozzle 18 and the stem 32 are connected. The displacement of the stem 32, parallel to the first pump axis A-A' allows distribution of the first cosmetic product from the first sampling tube 34 through the first pump 30 to the first product outlet 68.

The first sampling tube 34 is mounted upstream of the first pump 30 and protrudes downwardly from the first pump 30. It is immersed in the first reservoir 24 to sample the first cosmetic product in the first reservoir 24.

The second dispenser 16 is analogous to the first dispenser 14. For example, the second dispenser 16 is structurally identical to the first dispenser 14. The second dispenser 16 comprises a second pump 40, a second mobile stem 42 and a second sampling tube 44.

The second pump 40 extends along a second pump axis B-B'. The second pump axis B-B' is parallel to the longitudinal axis X-X' and parallel to the first pump axis A-A'.

The second mobile stem 42 connects the second pump 40 to the distribution nozzle 18. The second mobile stem 42 is a mobile hollow rod which controls the actuation of the second pump 40. It comprises a second product outlet 78 at the top end of the stem 42 and a second annular groove 80. Said outlet 78 is inserted in the nozzle 18. The second annular groove 80 extends at the top end of the stem 42 around the second product outlet 78. As it will be explained below, the nozzle 18 extends within the second annular groove 80 so that the nozzle 18 and the stem 42 are connected. The displacement of the stem 42, generally parallel to the second pump axis B-B' allows distribution of the second cosmetic product from the second sampling tube 44 through the second pump 40 to the second product outlet 78.

The second sampling tube 44 is mounted upstream of the second pump 40 and protrudes downwardly from the first pump 40. It is immersed in the second reservoir 26 to sample the second cosmetic product in the second reservoir 26.

The distribution nozzle 18 is connected to the first dispenser 14 and to the second dispenser 16. In particular, the distribution nozzle 18 is connected to the first mobile stem 32 and to the second mobile stem 42. It is mobile with regards to the container 12 between an upper rest position (shown on FIG. 1) and a lower dispensing position (shown on FIG. 2). The distribution nozzle 18 is configured to be displaced from the rest position to the dispensing position by a user to draw the first cosmetic product and the second cosmetic product from the container 12.

The distribution nozzle 18 comprises at least a duct 48, 50 for dispensing the first cosmetic product and the second cosmetic product, a top push surface 52 and a guiding wall 54. For example, as shown on the figures, the distribution nozzle comprises a first dispensing duct 48 and a second dispensing duct 50. The distribution nozzle 18 further comprises at least a dispensing opening (not visible on the drawings) fluidically connected to the at least one duct 48, 50 and adapted to dispense the cosmetic products outside of the nozzle 18.

The at least one duct 48, 50 is fluidically connected to the first product outlet of the first mobile stem 32 and to the second product outlet of the second mobile stem 42. The first dispensing duct 48 is connected to the first mobile stem 32 and the second dispensing duct 50 is connected to the second mobile stem 42. The first dispensing duct 48 comprises a tubular wall delimiting a flow path through which the first cosmetic product is designed to flow. The second dispensing duct 50 comprises a tubular wall delimiting a flow path through which the second cosmetic product is designed to flow. The first and second dispensing ducts 48, 50 are connected to a single dispensing opening. In a variant, the first and second dispensing ducts 48, 50 are each connected to a respective dispensing opening.

The push surface 52 is designed to be pushed by a user to displace the distribution nozzle 18 from the rest position to the dispensing position. When the push surface 52 is pushed, the distribution nozzle 18 is displaced along the device axis X-X' towards the container 12. For example, the device 10 further comprises a spring mechanism (not shown), configured to bring the distribution nozzle 18 back from the dispensing position to the rest position when the user does not push on the push surface 52.

As it will be described more in detail below, the guiding wall 54 is guided by the guiding support 20 between the rest position and the dispensing position. In particular, the guiding wall 54 of the nozzle 18 is guided by an inner guiding portion 58 and an outer guiding portion 60 of the guiding support 20, within an intermediate guiding space 62 so that the nozzle 18 is displaced exclusively in translation parallel to the first and second pump axes A-A', B-B' between the rest and dispensing positions. For example, the guiding wall 54 of the nozzle slides on the inner guiding portion 58 and on the outer guiding portion 60 of the guiding support 20 between the rest position and the dispensing position.

The guiding support 20 is mounted on the container 12 between the container 12 and the nozzle 18. The guiding support 20 comprises the inner guiding portion 58 and the outer guiding portion 60. The inner guiding portion 58 and the outer guiding portion 60 define the intermediate guiding space 62 between them.

The guiding support 20 further comprises a junction portion 64 connecting the inner guiding portion 58 and the outer guiding portion 60. If so, the intermediate guiding space 62 is delimited between the inner guiding portion 58, the outer guiding portion 60 and the junction portion 64.

For example, the inner guiding portion 58 comprises two collars 84, each mobile stem 32, 42 being guided by one collar 84 between the rest position and the dispensing position. Advantageously, the inner guiding portion 58 further comprises at least an inner sleeve 86. As shown on the figures, the inner guiding portion comprises two inner sleeves 86. The inner guiding portion 58 further comprises an inner intermediate connection region between the inner sleeves 86. Here, the inner guiding portion 58 further comprises radial fins 90 protruding radially outwards from the or each inner sleeve 86. For example, as shown on FIG. 3, the inner guiding portion 58 comprises, for each inner sleeve 86, three radial fins 90 protruding from said inner sleeve 86.

The outer guiding portion 60 comprises at least an outer sleeve 96. As show on the figures, the outer guiding portion 60 advantageously comprises two outer sleeves 96. If so, the outer guiding portion 60 further comprises an outer intermediate connection region 98 (visible on FIG. 3) between the outer sleeves 96. The outer guiding portion 60 comprises an inner surface facing the first pump axis A-A' and/or the second pump axis B-B' and an outer surface opposite the inner surface.

The junction portion 64 comprises at least an annular junction 102. As shown on the figures, the junction portion 64 comprises two annular junctions 102.

The intermediate guiding space 62 is complementary to the guiding wall 54 of the nozzle 18 so that between the rest position and the dispensing position, the nozzle 18 is displaced according to a single degree of freedom corresponding to a component of translation parallel to the first and second pump axes A-A', B-B'. By "complementary" it is meant that the shape of the intermediate guiding space 62 is complementary to the shape of the guiding wall 54. The outer intermediate connection region 98 outwardly delimits at least part of the intermediate guiding space 62 and protrudes towards a plane comprising the first and second pump axes A-A, B-B'. The guiding wall 54 is guided in the intermediate guiding space 62 by the outer intermediate connection region 98 between the rest and dispensing positions. For example, the intermediate guiding space is defined between the radial fins 90 and the or each outer sleeve 96. In a non-illustrated variant, the inner intermediate connection region has a recess extending towards the plane comprising the first and second pump axes A-A', B-B' and inwardly delimits at least part of the intermediate guiding space 62. The guiding wall 54 is then further guided in the intermediate guiding space 62 by the inner intermediate connection region between the rest and dispensing positions.

The annular groove 70, 80 of each stem 32, 42 is centered around the corresponding pump axis A-A', B-B'. The tubular wall of each dispensing duct 48, 50 extends within the corresponding annular groove 70, 80.

As shown on the figures, each inner sleeve 86 has a cross-section which when it is taken in projection onto a projection plane perpendicular to the first pump axis A-A' and to the second pump axis B-B', it has a substantially circular shape. Each inner sleeve 86 has a width. The width of each inner sleeve 86 corresponds to its diameter.

As shown on the figures, each outer sleeve 96 has a cross-section which when it is taken in projection onto the projection plane, it has a substantially arc of a circle shape.

The inner intermediate connection region is a junction between the two inner sleeve 86. For example, as shown on FIGS. 1 and 2, the inner intermediate connection region extends in a plane of extension of the annular junction 102. The two inner sleeves 86 and the intermediate connection region delimit a space between them. The inner intermediate connection region has a minimum width which when taken in projection onto the projection plane is smaller than a maximum width of each inner sleeve 86. The minimum width of the inner intermediate connection region corresponds to a minimum distance between the two inner sleeves 86.

Each radial fin 90 extends within a plane that comprises the first pump axis A-A' or the second pump axis B-B'. As shown on the figures, each radial fin 90 protrudes from a portion of the corresponding inner sleeve 86 that is opposite to the inner intermediate connection region, towards an outer sleeve 96. Each radial fin 90 extends from the corresponding inner sleeve 86 to a guiding edge 106. Said guiding edge 106 extends parallel to the corresponding pump axis A-A', B-B'. The guiding wall 54 is guided by contact with the outer sleeve 96 and with the guiding edges 106 between the rest and dispensing positions.

Outer intermediate connection region 98 corresponds to a transition zone between the two outer sleeves 96. The outer intermediate connection region 98 constitutes a zone of constriction between the two outer sleeves 96. It is a curved area comprising an apex, the apex being oriented towards the inner intermediate connection region. As shown on FIG. 3, the intermediate guiding space 62 has thus a cross-section which when it is taken in projection onto the projection plane, it has approximately an eight shape. This arrangement further ensures that the displacement of the nozzle 18 is limited to a single degree of freedom. In particular, as shown on FIG. 3, the outer intermediate connection region 98 is defined by the inner surface of the outer guiding portion 60. The outer surface of the outer guiding portion 60 presents a substantially oval form that does not necessarily fit the shape of the inner surface.

The use of the device 10 for dispensing cosmetic products will be now described.

When a dose of the first and the second cosmetic products is to be dispensed, the user moves the nozzle 18 from the rest position to the dispensing position. To do so, the user advantageously pushes the nozzle 18 downwardly on the push surface 52 towards the container 12. During this movement, the guiding wall 54 of the nozzle 18 is guided by the inner and outer guiding portions 58, 60 within the intermediate guiding space 62 so that the nozzle 18 is displaced parallel to the first and second pump axes A-A', B-B' from the rest position to the dispensing position.

During this movement, the mobile stems 32, 42 move downwardly and activate the pumps 30, 40.

The first cosmetic product is then pumped from the first reservoir 24 in the first sampling tube 34, through the first pump 30 to the first mobile stem 32 and through the first dispensing duct 48 to the dispensing opening.

Simultaneously, the second cosmetic product is pumped from the second reservoir 26 in the second sampling tube 44, through the second pump 40 to the second mobile stem 42 and through the second dispensing duct 50 to the dispensing opening.

The two products can then be mixed by the user at the opening of the nozzle 18, outside the device 10.

For instance, the spring mechanism of the device 10 bring the distribution nozzle 18 back from the dispensing position to the rest position when the user stops pushing on the push surface 52. The device 10 is then ready to dispense again the cosmetic products.

According to a variant not shown, the outer surface of the outer guiding portion 60 fits the shape of the inner surface of the outer guiding portion 60. Therefore, the outer surface of the outer guiding portion 60 also has a cross-section which when it is taken in projection onto the projection plane, it has approximately an eight shape.

According to this variant, the device 10 further comprises a blocking element for blocking the distribution nozzle 18. The blocking element comprises a cooperating surface that fits the shape of the outer surface of the outer guiding portion 60, in particular facing the zone of constriction between the two outer sleeves 96, and an abutment surface that is substantially perpendicular to axes A-A', B-B'. It is movable between a blocking position in which it blocks the distribution nozzle 18 in the upper rest position and an unblocking position in which it allows the distribution nozzle 18 to move from the upper rest position to the lower dispensing position.

In the blocking position, the cooperating surface of the blocking element is flush with the outer surface of the outer guiding portion, in particular facing the zone of constriction between the two outer sleeves 96. In the blocking position, the distribution nozzle 18 rests on the abutment surface of the blocking element and cannot be moved towards the lower dispensing position.

In the unblocking position, the blocking element is away from the outer guiding portion. The distribution nozzle 18 can then be displaced from the upper rest position to the lower dispensing position.

Therefore, if a user wishes to block the distribution nozzle 18, her/she puts the blocking element in its blocking position. Before using the device 10, the user puts the blocking element in its unblocking position.

Thanks to the cooperation between the distribution nozzle 18 and the guiding support 20, the nozzle 18 is precisely guided parallel to both the pump axes A-A', B-B' so that both pumps 30, 40 are activated simultaneously and identically. This enables delivering amounts of first and second cosmetic products that are substantially equal.

The device 10 is therefore very precise in its product delivery while remaining easy to use and also to manufacture.

The invention claimed is:

1. A device for storing and dispensing at least two cosmetic products, comprising:

a container comprising at least a first reservoir configured to contain a first cosmetic product and a second reservoir configured to contain a second cosmetic product;

a first dispenser comprising a first pump extending along a first pump axis (A-A'), a first mobile stem and a first sampling tube immersed in the first reservoir;

a second dispenser comprising a second pump extending along a second pump axis (B-B') parallel to the first pump axis (A-A'), a second mobile stem and a second sampling tube immersed in the second reservoir;

a distribution nozzle, connected to the first mobile stem and to the second mobile stem, the distribution nozzle comprising at least a duct for dispensing the first cosmetic product and the second cosmetic product, the nozzle being mobile with regards to the container between a rest position and a dispensing position, the nozzle comprising a push surface and a guiding wall extending from the push surface towards the container;

characterized in that the device further comprises a guiding support mounted on the container between the container and the nozzle, the guiding support comprising an inner guiding portion and an outer guiding portion, the inner and outer guiding portions defining an intermediate guiding space, the guiding wall of the nozzle being guided by the inner and outer guiding portions within the intermediate guiding space so that the nozzle is displaced parallel to the first and second pump axes (A-A', B-B') between the rest position and the dispensing position.

2. The device according to claim 1, wherein the guiding wall of the nozzle slides on the inner guiding portion and on the outer guiding portion between the rest position and dispensing position.

3. The device according to claim 1, wherein the inner guiding portion comprises two collars, each mobile stem being guided by one collar between the rest position and the dispensing position.

4. The device according to claim 1, wherein the guiding support further comprises a junction portion connecting the inner guiding portion and the outer guiding portion, the intermediate guiding space being delimited between the inner guiding portion, the outer guiding portion and the junction portion.

5. The device according to claim 4, wherein the inner guiding portion comprises at least an inner sleeve, the outer guiding portion comprising at least an outer sleeve, the junction portion comprising at least an annular junction, the at least one annular junction connecting the at least one inner sleeve with the at least one outer sleeve, the intermediate guiding space being delimited between the at least one outer sleeve, the at least one inner sleeve and the at least one annular junction.

6. The device according to claim 5, wherein the intermediate guiding space is complementary to the guiding wall of the nozzle, so that, between the rest position and the dispensing position, the nozzle is displaced according to a single degree of freedom corresponding to a component of translation parallel to the first and second pump axes (A-A', B-B').

7. The device according to claim 5, wherein the outer guiding portion comprises two outer sleeves and an outer intermediate connection region between the outer sleeves, the outer intermediate connection region outwardly delimiting at least part of the intermediate guiding space, the outer intermediate connection region protruding towards a plane comprising the first and second pump axes (A-A', B-B'), and/or the inner guiding portion comprises two inner sleeves and an inner intermediate connection region between the inner sleeves, the inner intermediate connection region having a recess extending towards the plane comprising the first and second pump axes (A-A', B-B'), the inner intermediate connection region inwardly delimiting at least part of the intermediate guiding space, the guiding wall being further guided in the intermediate guiding space by the inner intermediate connection region and/or by the outer intermediate connection region between the rest and dispensing positions.

8. The device according to claim 7, wherein a minimum width of the inner intermediate connection region taken in projection onto a projection plane perpendicular to the first pump axis (A-A') and to the second pump axis (B-B') is smaller than a maximum width of each inner sleeve.

9. The device according to claim 5, wherein the inner guiding portion comprises radial fins protruding radially outwards from the or each inner sleeve, the intermediate guiding space being defined between the radial fins and the or each outer sleeve.

10. The device according to claim 1, wherein the cross section of the or each inner sleeve taken in projection onto a projection plane perpendicular to the first pump axis (A-A') and to the second pump axis (B-B') has a circular shape and/or the or each outer sleeve taken in projection onto the projection plane has a arc of a circle shape.

11. The device according to claim 1, wherein the nozzle comprises a first dispensing duct for dispensing the first cosmetic product and a second dispensing duct for dispensing the second cosmetic product, each duct being connected to its respective mobile stem.

12. The device according to claim 11, wherein each mobile stem comprises an annular groove, the first and second dispensing ducts each comprising a tubular wall delimiting a flow path through which the corresponding cosmetic product is designed to flow, each tubular wall extending within an annular groove of its stem.

13. A method for dispensing, comprising:

providing the device according to any one of the preceding claims;

moving the nozzle between the rest position and the dispensing position; and delivering simultaneously the first and second cosmetic products through the at least one duct, the guiding wall of the nozzle being guided by the inner and outer guiding portions within the intermediate guiding space so that the nozzle is displaced parallel to the first and second pump axes (A-A', B-B') between the rest position and the dispensing position.

14. The device according to claim 2, wherein the inner guiding portion comprises two collars, each mobile stem being guided by one collar between the rest position and the dispensing position.

15. The device according to claim 2, wherein the guiding support further comprises a junction portion connecting the inner guiding portion and the outer guiding portion, the intermediate guiding space being delimited between the inner guiding portion, the outer guiding portion and the junction portion.

16. The device according to claim 3, wherein the guiding support further comprises a junction portion connecting the inner guiding portion and the outer guiding portion, the intermediate guiding space being delimited between the inner guiding portion, the outer guiding portion and the junction portion.

17. The device according to claim 6, wherein the outer guiding portion comprises two outer sleeves and an outer intermediate connection region between the outer sleeves, the outer intermediate connection region outwardly delimiting at least part of the intermediate guiding space, the outer intermediate connection region protruding towards a plane comprising the first and second pump axes (A-A', B-B'), and/or the inner guiding portion comprises two inner sleeves and an inner intermediate connection region between the inner sleeves, the inner intermediate connection region having a recess extending towards the plane comprising the first and second pump axes (A-A', B-B'), the inner intermediate connection region inwardly delimiting at least part of the intermediate guiding space, the guiding wall being further guided in the intermediate guiding space by the inner intermediate connection region and/or by the outer intermediate connection region between the rest and dispensing positions.

18. The device according to claim 6, wherein the inner guiding portion comprises radial fins protruding radially outwards from the or each inner sleeve, the intermediate guiding space being defined between the radial fins and the or each outer sleeve.

19. The device according to claim 7, wherein the inner guiding portion comprises radial fins protruding radially outwards from the or each inner sleeve, the intermediate guiding space being defined between the radial fins and the or each outer sleeve.

20. The device according to claim 8, wherein the inner guiding portion comprises radial fins protruding radially outwards from the or each inner sleeve, the intermediate guiding space being defined between the radial fins and the or each outer sleeve.

* * * * *